Fig. I

INVENTOR.
Byron L. Brucken
BY J.C. Evans
His Attorney

May 30, 1967  B. L. BRUCKEN  3,321,940
ROD SUSPENSION FOR CLOTHES WASHING APPARATUS
Filed Jan. 21, 1965  4 Sheets-Sheet 2
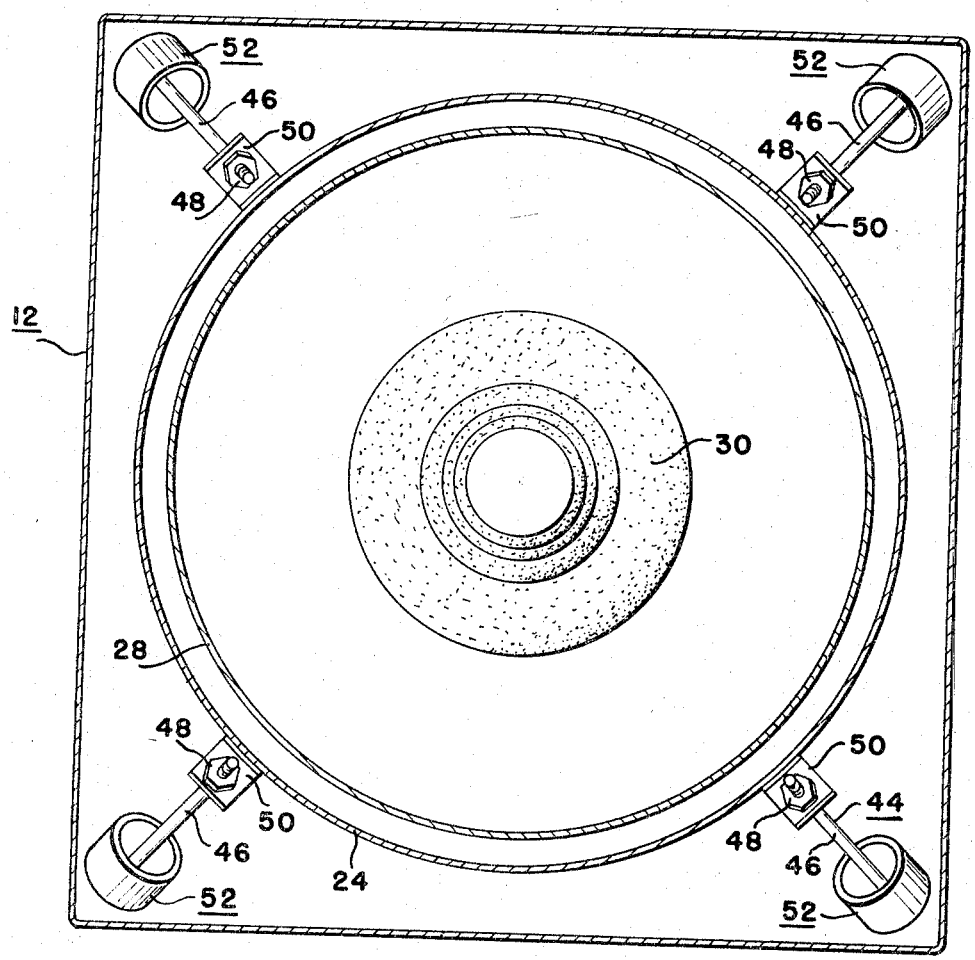
Fig. 2
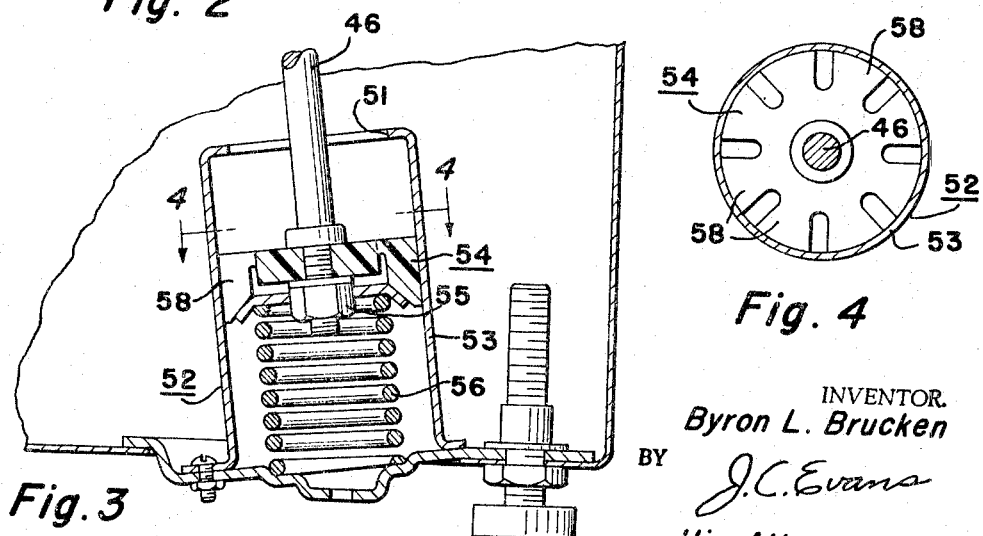
Fig. 3
Fig. 4
INVENTOR.
Byron L. Brucken
BY
J.C. Evans
His Attorney May 30, 1967            B. L. BRUCKEN            3,321,940
ROD SUSPENSION FOR CLOTHES WASHING APPARATUS
Filed Jan. 21, 1965            4 Sheets-Sheet 3

INVENTOR
Byron L. Brucken
BY J.C. Evans
His Attorney

May 30, 1967    B. L. BRUCKEN    3,321,940
ROD SUSPENSION FOR CLOTHES WASHING APPARATUS
Filed Jan. 21, 1965    4 Sheets-Sheet 4

INVENTOR.
Byron L. Brucken
BY J.C. Evans
His Attorney

United States Patent Office 3,321,940
Patented May 30, 1967

3,321,940
ROD SUSPENSION FOR CLOTHES WASHING APPARATUS
Byron L. Brucken, Dayton, Ohio, assignor to General Motors Corporation, Detroit, Mich., a corporation of Delaware
Filed Jan. 21, 1965, Ser. No. 426,899
5 Claims. (Cl. 68—23)

This invention relates to domestic clothes washers and the like and more particularly to a system for suspending water components within an outer cabinet.

In domestic washers of the type including a rotatable spin tub, in order to reduce transmissibility of unbalanced dynamic loadings to the outer cabinet, it is necessary to resiliently support the working components of the machine with respect to the outer cabinet. Moreover, in such suspension systems it is not only necessary to include an arrangement of supporting elements that reduces the transmission of forces to the outer cabinet, it is also necessary to include a provision for snubbing or damping high amplitude movements of the operative components that are induced during operation of the spin tub through its critical speed. Above the critical speed it is desirable that the suspension have a minimal snubbing action so that cabinet vibration and power dissipation will be minimized.

Accordingly, it is an object of the present invention to improve the suspension of a movable mass in a centrifuging device such as a spin tub type washing machine by the provision of plural suspension units that increase the suspended mobility of the movable mass so as to reduce power dissipation in the device while adequately restraining the mass through its critical speed of operation.

A further object of the invention is to improve the suspension of a movable mass in a centrifuging device such as a spin tub type washing machine by the provision of plural suspension units that freely support the movable mass to reduce dissipation of the power input thereto and include thermally responsive damper assemblies for adequately restraining the movable mass during its critical speed of operation.

A still further object of the present invention is to improve the suspension of a movable mass in a centrifuging device such as a spin tub type washing machine or the like on a fixed support by the provision of a suspension system including a combination elongated upstanding rod and damper assembly support units operative to relatively freely support the movable mass while adequately restraining it during critical speeds of operation.

Yet another object of the present invention is to improve the suspension of a movable mass in a centrifuging device such as a spin type washing machine by the provision of suspension units including elongated, upstanding rods and combination damper units that cooperate to restrict movement of the movable mass during critical spin speed operation and are thermally responsive to reduce restraint during operation outside the critical range while continuously, resiliently supporting the working components to reduce the transfer of unbalanced loading to the outer cabinet.

Yet another object of the present invention is to improve clothes washing machines of the type having a spin tub by the provision of a low-cost easily installed suspension system having a plurality of like combination snubbing and resilient support units including elongated, upstanding rods and means selectively operative to resist extreme movements of the washer components and operative to allow relatively free suspended mobility of the components during lesser movements thereof.

Further objects and advantages of the present invention will be apparent from the following description, reference being had to the accompanying drawings wherein preferred embodiments of the present invention are clearly shown.

In the drawings:

FIGURE 2 is a view in horizontal section taken along the line 2—2 of FIGURE 1;

FIGURE 3 is an enlarged fragmentary view in vertical section of a damper assembly in the suspension system of FIGURE 1;

FIGURE 4 is a view in horizontal section taken along the line 4—4 of FIGURE 3;

Figure 7:
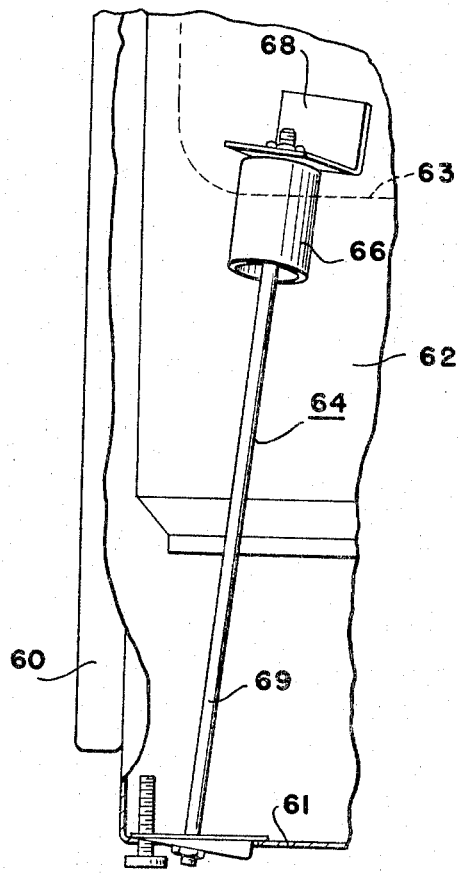
Figure 8:
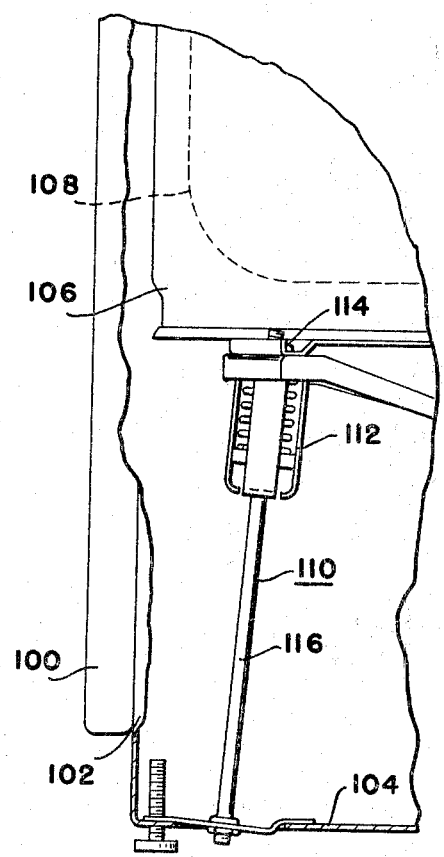

FIGURE 7 is a fragmentary view in vertical section of another embodiment of the invention showing the suspension unit thereof associated with only a portion of an outer cabinet and water container of a clothes washer; and FIGURE 8 is a fragmentary view in vertical section of another embodiment of the invention showing the suspension unit thereof associated with only a portion of an outer cabinet and water container of a clothes washer.

Figure 1:
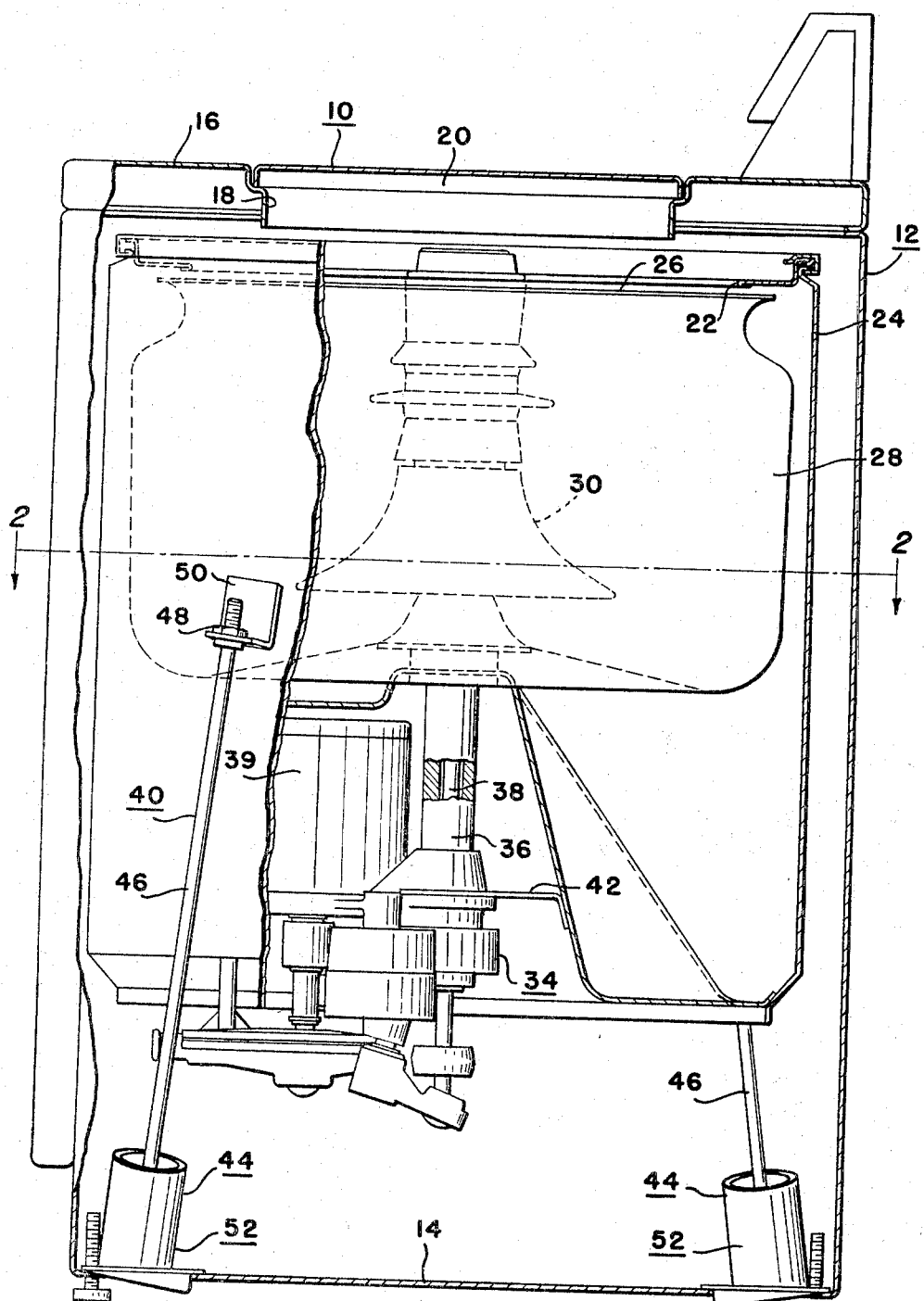
FIGURE 1 is a view in vertical section, partially broken away, of a clothes washer including the suspension system of the present invention.

Referring now to the drawings in FIGURE 1 a clothes washer 10 is illustrated including an outer cabinet 12 forming front, side and rear walls surrounding a base 14 of the machine. The machine is illustrated as being a top loading assembly having an upper surface 16 with a central opening 18 therethrough closed by a door 20. When the door is opened clothes can be loaded through opening 18, an opening 22 in a water container 24 and thence through an opening 26 into the interior of a spin tub 28. In the illustrated arrangement the spin tub 28 is enclosed by the water container 24 into which liquid cleaning media is discharged when the spin tub is rotated at high speeds.

An agitator 30 is located centrally of the spin tub 28 for agitating clothes during the operation of the washer. On the underside of the water container 24 is located a tub and agitator drive mechanism 34 including an outer shaft 36 and an inner shaft 38 connected, respectively, to the bottom of the spin tub 28 and the agitator 30. When a motor 39 of the mechanism 34 is energized, the shafts 36, 38 are selectively driven to vertically reciprocate the agitator 30 or spin the tub 28 depending upon the sequence of control at which the washer is operating. The mechanism 34, more particularly, is fixedly mounted to the underside of the water container by suitable brackets 42 and is of the type set forth in United States Patent No. 3,060,712, issued October 30, 1962.

In the illustrated embodiment, the water container 24 is supported on the base 14 by a suspension system 40 constructed in accordance with certain principles of the present invention. The illustrated washing machine 10 is merely representative of a typical centrifuging device having a movable mass therein represented in this embodiment of the invention by the water container 24 and its associated components.

In such devices, when the spinning component such as the tub 28 is operated, there is a transfer of dynamic forces through the suspension system into the fixed support represented herein by the base 14 which can cause undesirable support vibrations. These vibrations are of a substantial nature in washing machines in particular since random clothes distribution in the spin tub 28 often produces unbalanced loadings that magnify the dynamic forces. Moreover, since the outer housings of washing machines typically are formed of relatively lightweight sheet metal, the forces that are transferred thereto produce magnified vibrations therein capable of causing physical movement of the cabinet with respect to its supporting floor or at least undesirable noise problems.

Another problem typically found in centrifuging devices and in particular in clothes washers is that the movable suspended mass has an amplified movement when the spin component thereof passes through its critical speed of operation. For example, in the illustrated washer, when the spin tub 28 rotates in the range of 150 to 350 r.p.m., the water container, or movable mass, 24 can, depending upon the type of suspension system supporting it on a fixed support such as the base 14, strike the inner surface of a surrounding housing such as the cabinet 12. In order to adequately restrain the movable mass as its spin component passes through the critical speed of operation, many suspension systems have a substantial snubbing action that tends to increase the transfer of forces to the outer cabinet. Such snubbing action, in addition to causing an undesirable transfer of forces, also restrains the movable mass in a manner to cause an undesirable dissipation of the power input to the spinning component thereof whereby in certain cases the centrifuging device is unable to attain a desired rotative speed for accomplishing its intended purpose.

In accordance with certain principles of the present invention, therefore, the improved suspension system 40 of the present invention includes means for relatively freely supporting the suspended, movable mass with respect to a fixed support such as the base 14 in the present embodiment to substantially reduce force transfer thereto while retaining a desirable restraining action, especially through the critical speed of operation, to prevent amplified movement of the movable mass with respect to its fixed support.

More particularly, the suspension system, as best seen in FIGURES 1 and 2, includes a plurality of suspension units 44 connected between the base 14 of the machine and the water container 24 at each corner of the machine. Each of the suspension units 44 includes an elongated, upstanding rod 46 having one end thereof fixedly secured by suitable means such as a screw 48 threaded thereon to an L-shaped bracket 50 fixedly secured to the outer surface of the water container 24. Preferably, the connection between the rod 46 and bracket 50 lies substantially in the plane of the center of the mass of the suspended system.

The opposite end of the elongated, upstanding rod 46 is directed through an opening 51 in the top of a damper assembly 52 located at an outwardly offset point from the bracket 50 so that the rod 46 has an inclination from the vertical.

The damper assembly 52, as best seen in FIGURE 3, includes an inverted cup member 53 of a cylindrical tubular shape fixed to base 14 and a piston 54 fixedly secured by a screw 55 to the lower end of the rod 46 and slidably received in the cup for reciprocal movement relative thereto. Within the cup 53, beneath the piston 54, is located a spring 56 which resiliently supports the weight of the supported mass.

By virtue of the illustrated arrangement, the rods 46 of the corner located suspension units 44 serve to center the water container 24 and associated components interiorly of the cabinet 12 in spaced relationship with respect thereto. The suspension units 44 also serve as the sole means for carrying the weight of the water container 24 and associated components. The use of upstanding elongated rods 46 facilitates installation of the suspension system 40 in centrifuging devices such as the illustrated washing machine. Moreover, the rods have desirable flexibility for allowing lateral mobility of the suspended mass as well as sufficient column strength for supporting the weight of the mass.

By virtue of the illustrated arrangement, the suspended mass has a relatively free vertical and lateral mobility during operation of the spin tub 28 above and below its critical speed so that dynamic forces generated thereby during this period of operation are effectively isolated from the cabinet 12. Accordingly, cabinet vibrations are effectively minmized and any power dissipation produced by undesirable restraint of the suspended mass is materially reduced.

In operation, the suspension action of the units 44 during spin speeds above and below the critical speed is manifested by a progressive compression and decompression of the springs 56 in each of the damper assemblies 52 for preventing force transference to the cabinet 12. More particularly, when the spin tub 28 is running at its high spin speed, 1000 r.p.m. in one working embodiment, the water container 24 is moved to selectively and progressively reciprocate the upstanding rods 46 with respect to the damper assemblies 52. The motion pattern of the water container 24 during this period is more vertical than lateral for most conditions of unbalance. Any tendency for undesirable precession of the water container 24 is effectively damped by limited frictional forces developed between piston 54 and cup 53. Thus, assuming a clockwise movement of the water container 24, the right-hand, front damper unit 52 will have the spring thereof compressed and then the left, front damper unit will have its spring compressed and then the springs in the left rear and right rear damper units will be progressively compressed. As a particular spring in a particular damper unit 52 is compressed, its diagonal counterpart is extended and the other springs move to a balanced intermediate position. Such a progressive compression of the spring components in the damper assemblies 52 serves as an effective means for reducing transference of forces produced by the motion of the water container 24 so as to eliminate cabinet vibrations.

Another feature of the suspension units 44 is that the pistons 54 therein each has a plurality of flexible radially outwardly cup-engaging arms 58 of a suitable frictional material such as plastic that coacts with the inner surface of the cup 53 for producing the desired snubbing action. The plural fingers 58, because of their flexibility, serve to damp undesirable vibrations between the piston 54 and cup 53.

When the spin tub 28 is passing through its critical speed of operation, it causes a relatively increased movement of the water container 24 laterally with respect to the cabinet 12. In accordance with certain other of the principles of the present invention, the fingers 58 are thereby pressed against the inner surface of their associated cup 53 to produce a relatively greater frictional force therebetween. This causes the connection between the rod 46 and damper assemblies 52 to be more rigid and, accordingly, the increased movements of the container 24 are resisted to prevent it and its associated components from banging against the inside of the cabinet 12. An additional feature of the invention is that the elongated rods 46 have sufficient flexure to supplement the restraining action of the frictional engagement between fingers 58 and cups 53 to limit the transfer of dynamic forces in the system during the critical speed of operation.

Another feature of the snubbing action in the suspension units 44 is that movements of the water container 24 as the spin tub passes through its critical speed are amplified because of the length of the rods 46 whereby the effecting damping action of the assemblies 52 are magnified. Accordingly, because of the amplified movement, there is less need for critical adjustment of dimensional relations between the cups 53 and the pistons 54 as compared to other snubbing arrangements found in previous spin tub washer designs.

While four suspension units 44 are illustrated, it will be understood that in certain applications more units might be desirable and likewise a stable support would also be possible where three such units are used.

In the embodiment of FIGURES 1 through 4 the damper assemblies are shown as being fixedly secured to a fixed support represented by the base of the washing machine. While this arrangement is preferred in the illustrated use of the improved suspension systems, in certain other applications the suspension units can be turned upside down so that the damper assemblies are fixedly secured to a movable mass such as the water container.

One such arrangement is illustrated in the embodiment of the invention illustrated in FIGURE 7 which is a fragmentary view of a centrifuging device of the washing machine type illustrated in the first embodiment. Thus, a machine is illustrated having an outer cabinet 60 and a base 61 enclosing a water container 62 that surrounds a spin tub unit 63 driven by means of a drive mechanism such as illustrated in the first embodiment.

In this arrangement a suspension unit 64 is shown that is like the units 44 in the embodiment of FIGURES 1 through 4 but turned upside down. Thus, a damper assembly 66 of the suspension unit 64 is located adjacent the outer surface of the water container 62 where it is fixedly secured to an L-shaped bracket 68 thereon by suitable fastening means. An elongated rod 69 of the unit 64 is directed outwardly of the damper assembly 66 and inclined downwardly therefrom through the base 61 where it is secured thereto by suitable fastening means. The operation of the embodiment illustrated in FIGURE 7 is substantially like the operation of the embodiment shown in FIGURES 1 and 4 wherein movement of the container 62 causes relative reciprocation of a piston secured on the end of the rod 64 within the cup of the damper assembly 66 to produce desirable snubbing of the movement of the tub 62. As in the case of the first embodiment, the damper assembly 66 includes a spring for resiliently supporting the water container 62 for relatively free vertical mobility and the inherent flexibility of the upstanding rod 69 allows for desired lateral mobility of the system. While the embodiment is suited for many suspension problems in centrifuging devices, it is somewhat less desirable than the previously described embodiments in that the location of the damper assembly 66 on the tub 62 allows for less snubbing action through certain unbalanced loadings whereby a precession of a certain magnitude of the movable mass can cause system instability. If, however, the illustrated suspension unit is properly related to a particular application, this problem is of no consequence.

Figure 5:
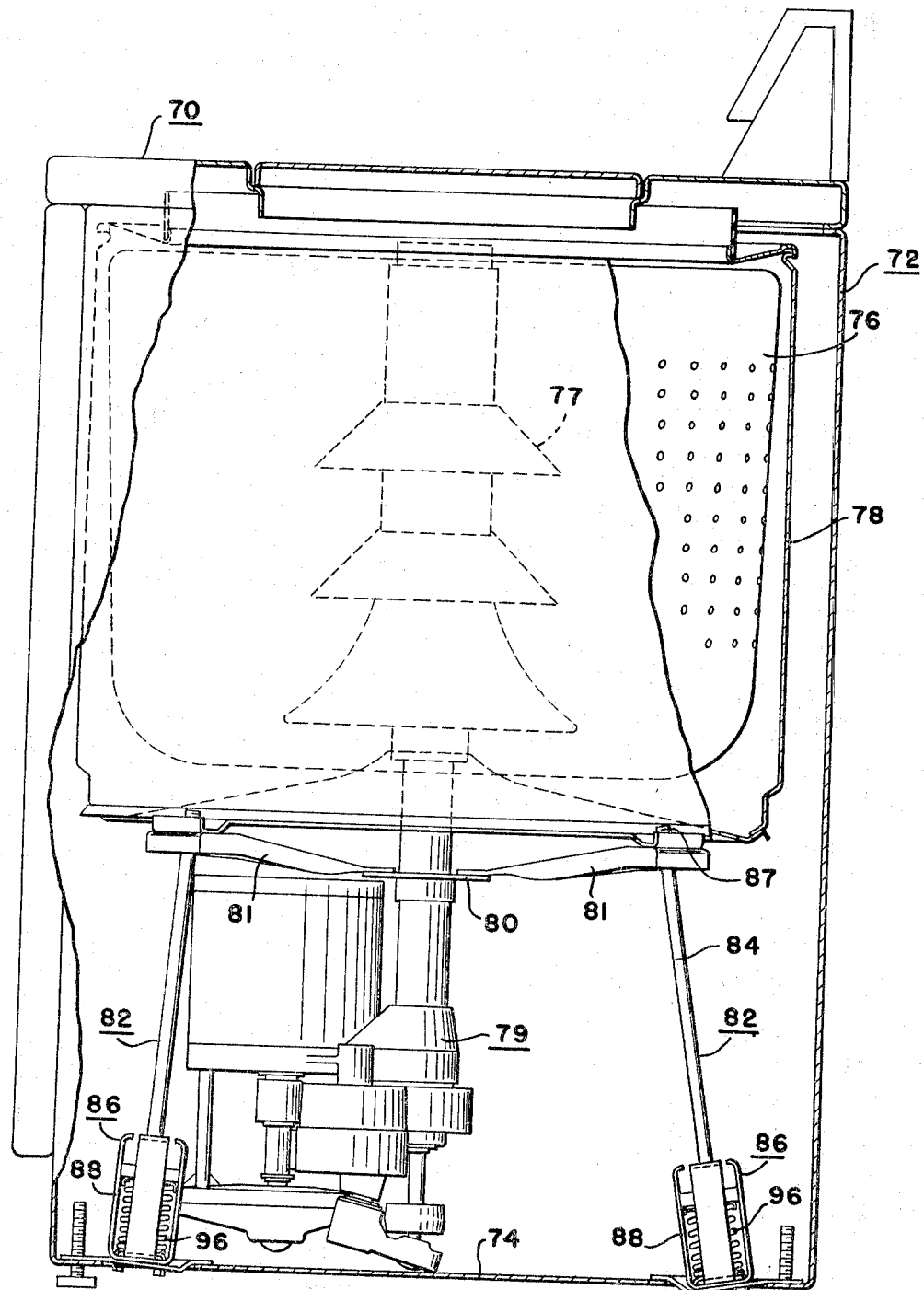
FIGURE 5 is a view in vertical section of a clothes washer including another embodiment of the present invention.
Figure 6:
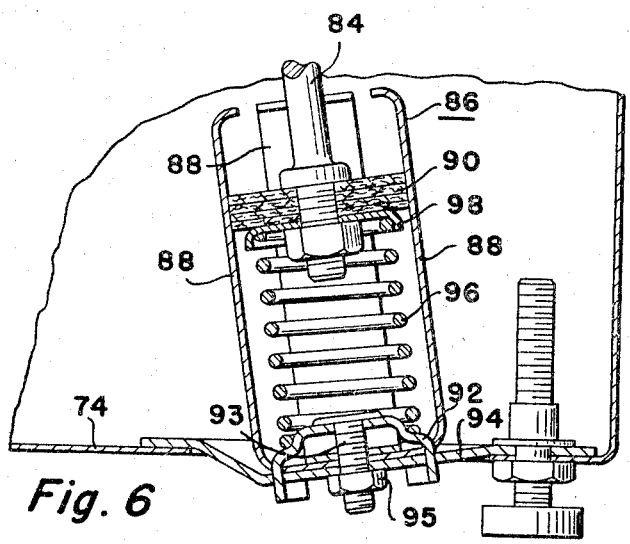
FIGURE 6 is an enlarged fragmentary view in vertical section of a damper assembly in the suspension system of FIGURE 5.

Another embodiment of the invention in FIGURES 5 and 6 is shown as including a clothes washer 70 having an outer cabinet 72 with front, side and rear walls and a base 74. The machine is illustrated as being of the top loading type as described in the first embodiment and includes a perforated spin tub 76 located within a water container 78 spaced from the outer cabinet 72. Within the perforated spin tub 72 is located an agitator 77 representatively being of the vertical reciprocating type driven off a drive mechanism 79 like 34 in the first embodiment which is selectively operatively connected to drive the agitator 77 or rotate the spin tub 76 depending upon the phase of operation of the machine 70. A collar 80 on the mechanism 79 is connected to brackets 81 fixedly secured to the bottom of container 78 for securing the mechanism 79 for movement therewith.

In this embodiment of the invention a plurality of suspension units 82 are arranged around the water container 78 to provide a stable yet unrestrained support of the movable mass on the base 74. It will be understood that the machine 70 may have four corner supports as shown in the first embodiment or as suggested in the first embodiment may include more than four or as a minimum three of such support units to produce a stable support for various types of centrifuging devices.

Each of the units 82 further includes an elongated standing rod 84 having one end thereof fixed at 87 to the water container 78 and the opposite end thereof supportingly received within a damper assembly 86 of the suspension unit 82.

As in the case of the first embodiment, the rods 84 serve to center the water container 78 with respect to the cabinet 72 and have sufficient flexibility to permit a desired lateral mobility of the water container 78 and its associated components to limit transfer of unbalanced loadings to the cabinet 72.

Each damper assembly 86, as best seen in FIGURE 6, includes a plurality of flexible straps 88 that form side walls of a cup-like member for slidably supportingly receiving a piston 90 secured to the lower end of the rod 84. The straps 88 are turned inwardly at their upper ends to hold the piston 90 therein during reciprocal movement thereof with respect to the straps. The flexible straps 88 are fixed at the lower ends thereof to the base 74 by a retainer plate 92 having a stud 93 directed through a reinforcing gusset 94 on base 74 where a screw 95 threaded thereon holds the straps 88 in fixed engagement between plate 92 and gusset 94. As in the first embodiment within the cup or cylinder formed by the straps 88 is located a compression spring 96 that resiliently supports the weight of the water container 78 and associated components with respect to the outer cabinet 72 to thereby allow substantial vertical mobility of the movable mass with respect to the cabinet 72. The spring 96 is supported by plate 92 at one end thereof and a cup-shaped spring plate 98 at the opposite end thereof.

One feature of this embodiment of the present invention is that the piston 90 is formed of a porous material, for example low-cost paper, leather, sintered metal or the like that has a friction agent received in the porous openings therein to produce a predetermined snubbing action between the piston 90 and the straps 86 upon relative reciprocal movement therebetween. In one working embodiment the friction agent was polybutene having a viscosity from H–50 through H–300. Such a friction agent can further be characterized as having a variable friction force generating characteristic that is directly proportional to the temperature thereof. By virtue of this temperature responsive characteristic of the friction agent, it has been found that during periods when the spin tub 76 is first operated, at which time it passes through the critical speed, the friction agent is at ambient temperatures and thereby has an ability to produce a relatively greater snubbing action required to effectively restrain the large amplitude movements of the water container that occur through the critical speed range. However, upon continued spinning of the tub 76, reciprocal movement between the piston 90 and straps 88 causes the agent to heat to a point where the friction forces produced thereby are materially reduced. Thus, at high spin speeds, when the amplitude of the water container 78 is within reasonable limits, the snubbing action of the damper assembly 86 will be materially reduced and the increased vertical and lateral mobility will serve as a highly effective means for reducing transfer of unbalanced loadings from the movable water container 78 to the outer cabinet 72.

Another feature of the suspension unit 82 is observed during the operation of the spin tub 76 at critical speed. In this case, the large amplitude movements of the container 78 transmitted into the damper assembly 86 through the upstanding rods 84 causes the straps 88 to flex so that the friction producing surface on the piston 90 is continually maintained in a good frictional engagement with the straps 88 so that unusually good snubbing action is obtained, notwithstanding the location of unbalanced loadings within the spin tub 76. As an extreme example, in cases where the unbalanced loading is arranged in the plane of the center of mass of the suspended system at which time the movements of the water container 78 are solely in a lateral direction, the piston 90 will be thrust against a particular one of the flexible straps 88 to cause it to move from its originally inclined position to a vertical position and thus cause a limited relative reciprocal movement between the piston 90 and member 88 to produce the desired snubbing action while nevertheless retaining system mobility to reduce force transfer to the outer cabinet 72.

Yet another embodiment of the invention is illustrated in FIGURE 8 which shows a fragmentary view of a washing machine 100 having an outer cabinet 102 and a base 104 that encloses a water container 106 of the type shown in the embodiment of FIGURES 5 and 6. Within the water container 106 is located a spin tub 108 driven by a drive mechanism of the type previously mentioned. In this embodiment a suspension unit 110 is shown that is like the suspension unit in the embodiment of FIGURES 5 and 6. In this case, the suspension unit 110 is turned end for end as compared to the units in FIGURES 5 and 6. Thus, a damper assembly 112 of the unit 110 is located immediately below the water container 106 so that the base of the assembly 112 is fixedly secured thereto at 114. An elongated rod 116 of the unit 110 depends from the assembly 112 and is directed through the base 104 where it is fixedly secured thereto by suitable fastening means. This embodiment of the invention operates like the embodiment shown in FIGURES 5 and 6 with the main difference being the location of the damper assemblies with respect to the water container. While the unit is suitable for many suspension applications, as was the case in the embodiment of FIGURE 7, it has a lesser stability against magnified precession tendencies of the water container 106 when applied to certain operative units. This problem, however, is only present when the units 110 are mismatched to a particular application.

In view of the above remarks, it will be appreciated by those skilled in the art that the present invention enables the operative components of a centrifugal device to be quickly and accurately supported and centered within an outer cabinet or fixed support by a plurality of units each characterized by its ability to selectively, relatively, rigidly support a movable supported mass as a centrifugal component passes through its critical speed range and also to quickly return to a relatively free supporting phase of operation following the critical speed range wherein the suspended system is free to move with respect to the fixed support to reduce vibrations therein and to reduce power dissipation in the system because of an undesirable restraint thereof.

While the embodiments of the present invention as herein disclosed constitute preferred forms, it is to be understood that other forms might be adopted.

What is claimed is as follows:

1. In a centrifuging device, the combination of, support means, movable means, a plurality of suspension units for supportingly centering said movable means with respect to said support means, means for rigidly fixing the opposite ends of said units to said movable means and to said support means, each of said units including an elongated rod directed upwardly from said support means for allowing lateral mobility of said movable means, resilient means supporting said movable means for vertical mobility, and damper means including a tubular member fixedly secured to said support means and a piston on said rod reciprocal relative to said member for snubbing predetermined movements of said movable means with respect to said support means, said tubular member including a flexible wall portion yieldable against lateral movement of said piston for producing a snubbing action in direct proportion to the amplitude of movement of said movable means.

2. In a centrifuging device, the combination of, support means, movable means, a plurality of suspension units for supportingly centering said movable means with respect to said support means, means for rigidly fixing the opposite ends of said units to said movable means and to said support means, each of said units including an elongated rod directed upwardly from said support means for allowing lateral mobility of said movable means, resilient means supporting said movable means for vertical mobility, and damper means including a tubular member fixedly secured to said support means and a piston on said rod reciprocal relative to said member for snubbing predetermined movements of said movable means with respect to said support means, said tubular member including a plurality of separate flexible spring straps each yieldably engaging said piston to prevent cocking movement of said piston with respect thereto through the orbital range of said movable means.

3. In a centrifuging device, the combination of, support means, movable means, a plurality of a suspension units for supportingly centering said movable means with respect to said support means, means for rigidly fixing the opposite ends of said units to said movable means and to said support means, each of said units including an elongated rod directed upwardly from said support means for allowing lateral mobility of said movable means, resilient means supporting said movable means for vertical mobility, and damper means including a tubular member fixedly secured to said support means and a piston on said rod reciprocal relative to said member for snubbing predetermined movements of said movable means with respect to said support means, said piston having a porous outer surface, a friction agent in said porous outer surface for producing predetermined snubbing in response to a relative movement between said piston and said tubular member.

4. In a centrifuging device, the combination of support means, movable means, a plurality of suspension units for supportingly centering said movable means with respect to said support means, means for rigidly fixing the opposite ends of said units to said movable means and to said support means, each of said units including an elongated rod directed upwardly from said support means for allowing lateral mobility of said support means, resilient means supporting said movable means for vertical mobility, and damper means including a tubular member fixedly secured to said support means, and a piston on said rod reciprocal relative to said member for snubbing predetermined movements of said movable means with respect to said support means, said piston having a porous outer surface, a friction agent in said porous outer surface for producing predetermined snubbing in response to a relative movement between said piston and said tubular member, said friction agent being temperature responsive for producing a progressively decreasing snubbing action upon a temperature increase thereof.

5. In a washing machine, the combination of, an outer cabinet including a base, a water container located within said cabinet, clothes cleaning means including a spin tub rotatably supported within said water container, a plurality of suspension units connected between said water container and the base of said outer cabinet, said suspension units serving as the sole means for supporting the weight of the water container and clothes cleaning means thereon, each of said suspension units including an elongated standing rod having one end thereof fixed to said water container for centering it within said cabinet, each of said suspension units including a damper assembly connected to the opposite end of said rod at a point offset from the rod connection on said container for damping movements of said water container with respect to said cabinet, said rod flexing during operation of said spin tub through its critical speed of operation to reduce cabinet vibrations, said damper assemblies including a tubular member connected to said outer cabinet and a piston member fixed to said rod slidably reciprocated within said tubular member, said resilient means being located within said tubular member for resiliently supporting said water container for relatively free vertical mobility thereof during the operation of the machine, said cup-shaped member having yieldable side walls, said piston having a porous surface including an impregnated friction agent interacting with the inner surface of said side walls during operation of said spin tub to resist movements of said water container, said friction agent coacting with said side walls and piston to a greater degree upon operation of said spin tub below and at its critical speed of operation for snubbing movements of said tub during critical speed operation.

References Cited

UNITED STATES PATENTS

| | | | |
|---|---|---|---|
| 2,711,297 | 6/1955 | Thiele | 248—18 |
| 2,948,401 | 8/1960 | Obermajer | 68—23 X |
| 2,969,172 | 1/1961 | Hutt | 68—23 X |

FOREIGN PATENTS

| | | |
|---|---|---|
| 1,257,027 | 2/1961 | France. |
| 1,383,101 | 11/1964 | France. |
| 772,419 | 4/1957 | Great Britain. |

WILLIAM I. PRICE, *Primary Examiner.*